Feb. 14, 1967   R. C. MORTON   3,303,767
MISS-DISTANCE INDICATOR
Filed Dec. 21, 1964   3 Sheets-Sheet 1

INVENTOR.
RAYMOND C. MORTON
BY
AGENT
ATTORNEY

INVENTOR.
RAYMOND C. MORTON

United States Patent Office 3,303,767
Patented Feb. 14, 1967

3,303,767
MISS-DISTANCE INDICATOR
Raymond C. Morton, 3030 Citrus, Oxnard, Calif. 95610
Filed Dec. 21, 1964, Ser. No. 420,230
7 Claims. (Cl. 95—12.5)

The invention described herein may be manufactured and used by or for the Government of the United States of America for governmental purposes without the payment of any royalties thereon or therefor.

The invention relates to apparatus for determining the vector miss distance between an airborne target and a missile which has been launched with the intention of impacting such target.

In the testing and evaluation of guided missiles and rockets, there is a requirement for a dependable device or apparatus which will yield information as to the performance of any projectile being tested with a view toward its subsequent employment under combat conditions. A number of different arrangements are now known by means of which this data may be obtained with varying degrees of accuracy, many of which, such as radar, depend for their operation upon electromagnetic principles. That is, they measure the time required for electromagnetic energy to be radiated from the target, intercepted by the missile, and then reflected back to the target. The "miss distance" required is a direct function of the time elapsing between the respective instants at which the energy is emitted and subsequently received by the target.

Other methods of operation are based upon the so-called "Doppler" principle which makes use of a shift in frequency between the emitted and received signals, and have yielded satisfactory results in cases where the missile does not approach within a given distance of the target, except that the vector relationship therebetween can not be ascertained. Furthermore, should this approach distance not exceed a certain minimum figure, then the information provided by the system is often unreliable, since electronic circuitry as presently employed in such arrangements is incapable of functioning with sufficient speed to take into account the time delay inherent in the circuit components themselves. Furthermore, complex electronic equipment is susceptible to malfunction, and the weight of this apparatus, when employed on a relatively small target, decreases the ability of the latter to carry other equipment necessary to perform related evaluation functions.

In many instances it is unnecessary to have immediately available data which miss-distance indicators are normally capable of providing. Under such conditions, it is feasible to substitute for the electromagnetic type of system one which operates on an optical basis. Conventionally, a plurality of cameras have been located at strategic points on the target, with each camera being positioned to cover a separate field of view.

Normally associated with these cameras is some means for activating the optical units in timed sequence so that a complete visual picture of a missile may be obtained as the latter passes in close proximity to the target. In certain cases, these cameras are of the motion-picture type capable of recording a number of different positions of the missile during its flight. However, in extremely high-speed missile operations, motion picture cameras have been found generally incapable of functioning with sufficient speed to cover a substantial portion of the missile's trajectory, and thus much valuable data is lost. On the other hand, if the cameras are of the "single-shot" type, they fail to provide a comparison between the position of the missile at one particular instant of time and its position at a predetermined period of time thereafter, and thus the velocity of the missile as well as its trajectory are difficult if not impossible to ascertain with accuracy.

One further disadvantage possessed by optical miss-distance indicators of the type above described is that they increase the drag of the target aircraft and consequently reduce the maximum speed thereof. In many cases this cannot be tolerated, especially when extremely high-velocity missiles are being evaluated. An added factor closely related to the aerodynamic characteristics of such optical devices is the fact that motion-picture cameras are generally of a complex nature and hence not only possess considerable weight but require enclosures of relatively large dimensions.

In accordance with one feature of the present disclosure, apparatus is provided for determining the distance by which a missile launched toward an airborne target fails to impact the latter, this apparatus operating upon optical principles while at the same time eliminating many of the disadvantages previously inherent in such equipment. This result is achieved primarily by the expedient of locating a pair of cameras in a unitary enclosure containing one shutter arranged to sequentially expose the films in the two cameras during a single movement. In a preferred embodiment, this shutter is designed to rotate about an axis lying intermediate the respective optical axes of the two cameras, the shutter possessing an aperture which sequentially exposes the two films as the shutter rotates through a limited angle. This rotation of the shutter is preferably brought about by a particular motion-converting assembly which is designed to translate the linear motion of a piston member into a rotary motion of the shutter. Inasmuch as the latter must complete its movement within a very short period of time in order that the two sequential pictures be obtained as rapidly as possible, the piston is caused to undergo its linear movement as a result of the ignition of an explosive charge which is contained within the cylinder through which the piston travels. This explosive charge is ignited at a time when the missile is in close proximity to the target, and this time is readily determinable by any wel-known equipment such, for example, as a proximity fuse or other device which is activated in response to changes in the character of the energy emitted by the missile during its flight.

One object of the present invention, therefore, is to provide an improved miss-distance indicator useful in evaluating the performance capabilities of projectiles such as guided missiles and rockets.

Another object of the invention is to provide a miss-distance indicator of the type described which operates upon optical principles while at the same time eliminating many of the complex characteristics of known design without any degradation of the data obtained.

A still further object of the invention is to provide an optical scoring system which is intended to photograph the passage of a projectile past a target in a plurality of instantaneous positions so that not only may the miss distance between the missile and target be obtained but also the trajectory of the missile as calculated from the difference in location thereof from one photographed position to the other.

An additional object of the invention is to provide an optical miss-distance indicator which employs a pair of cameras utilizing a single rotary shutter designed for association with each camera and operating to sequentially expose the film in each camera within a predetermined period of time governed by the speed at which the shutter moves during its operation.

A still further object of the invention is to provide a miss-distance indicator utilizing a pair of camera units having a single rotary shutter the operation of which is brought about by converting the linear motion of a movable piston into rotary shutter motion, this translation being achieved by utilizing a pin associated with the shutter and projecting outwardly therefrom to ride in a curvilinear groove formed on the linearly-moving piston.

Other objects, advantages, and novel features of the invention will become apparent from the following detailed description of the invention when considered in conjunction with the accompanying drawings, wherein.

Figure 3:
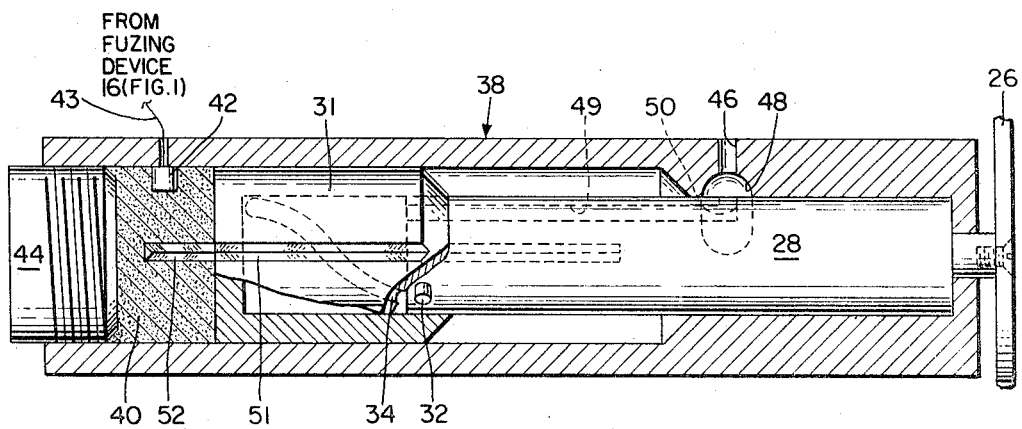
FIG. 3 is a sectional view of the motion-converting means of applicant's miss-distance indicator, bringing out the manner in which linear movement of a piston member is converted into rotary motion of the shaft on which the camera shutter is mounted.
Figure 5:
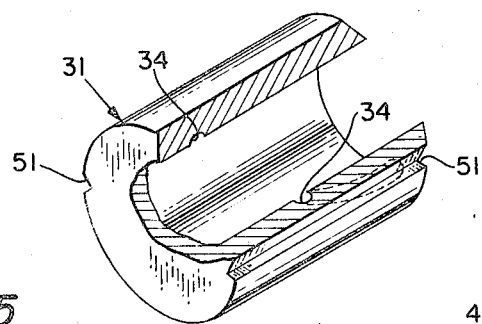
Figure 4:
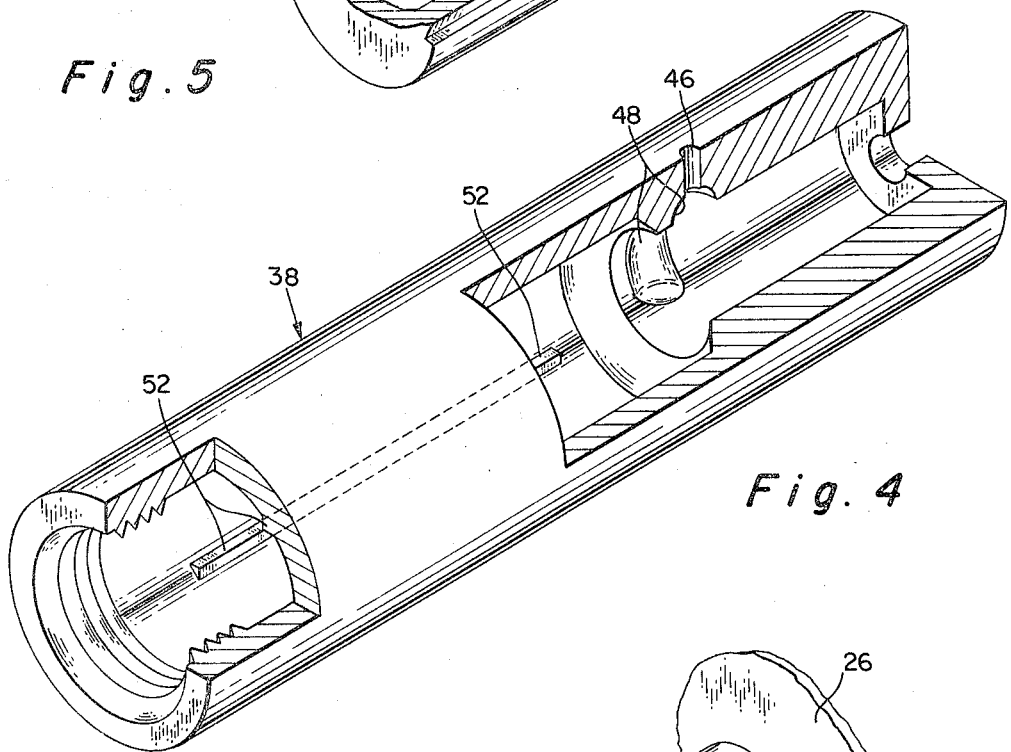
FIG. 4 is a perspective view, partially broken away, of the cylindrical housing for the respective motion-converting elements, illustrating in greater detail the configuration of one linear ridge or guide formed on the inner wall of the cylinder.
Figure 6:
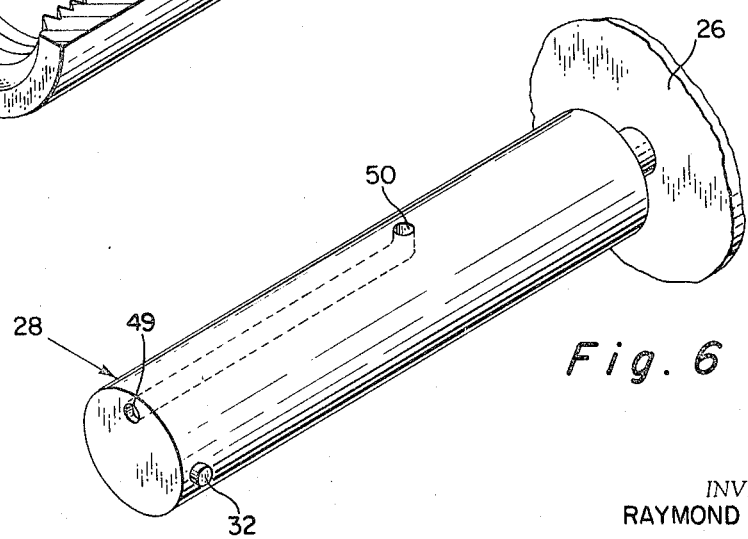

FIG. 5 is a perspective view of the piston member of FIG. 3, showing the linear grooves formed in the outer wall thereof, one of which rides in the linear ridge of FIG. 4, and further showing an inner spiral slot into which the projecting pin of the rotary shaft of FIG. 3 projects when the components are in assembled condition; and FIG. 6 is a side view of the rotary shaft of FIG. 3, further illustrating the pin which is receivable in the spiral slot of the piston shown in FIG. 5.

Figure 1:
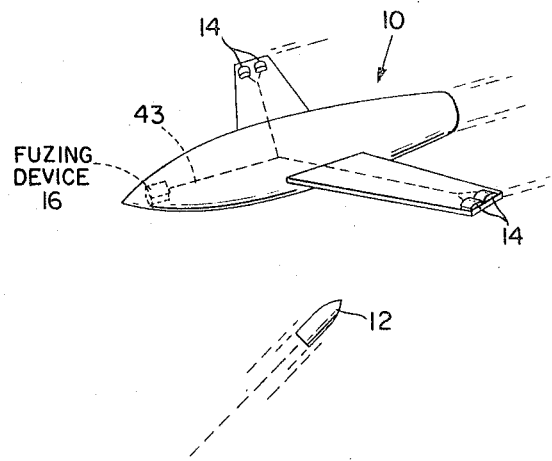
FIG. 1 is a somewhat schematic view of a target aircraft on the respective wings of which a pair of optical miss-distance indicators of the type herein described have been installed.

Referring now to the drawings, there is shown in FIG. 1 a target aircraft 10 (such as a drone) toward which a missile 12 has been launched with the object of determining the performance capabilities thereof. Expressed differently, it is desired to ascertain the distance by which the missile 12 fails to impact the target aircraft 10.

The present invention provides means for yielding this information, such means comprising a pair of optical scoring units 14 respectively mounted on the wing tips of the drone aircraft. These optical units 14 are intended to be triggered or activated at the time that the missile 12 is at its point of closest approach to the target, and, to achieve this objective, an electrical signal is supplied to each of the camera units 14 from a proximity fusing device 16 which may be of any suitable type now known in the art. It should be understood that the design of this fusing device 16 forms no part of the present invention, and that it is utilized solely for the purpose of energizing the particular camera units which will hereinafter be described in detail.

Figure 2:
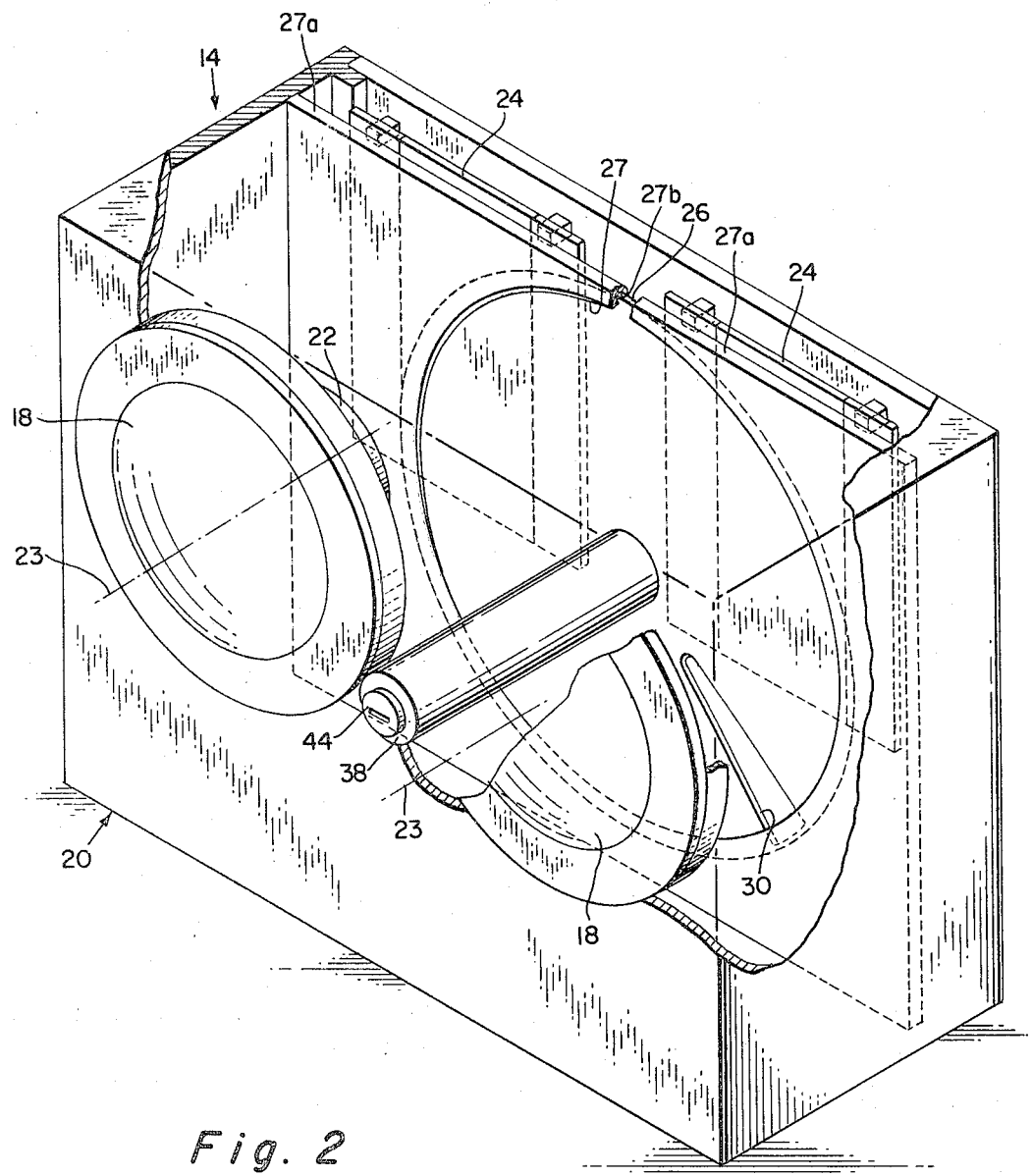
FIG. 2 is an isometric view, partially broken away, of one of the dual camera units of FIG. 1, showing the single shutter associated with the respective camera structures.

FIG. 2 of the drawing illustrates certain features of each camera unit 14. Since these units are identical in all respects, a description of one will apply to the other as well. The assembly as shown in FIG. 2 includes a pair of wide-angle lenses 18 mounted in spaced-apart relation in one wall of a box-like housing 20. In conventional fashion, each lens 18 has associated therewith other light-collecting and/or directing components collectively designated by the reference numeral 22. As shown, the respective optical axes 23 of the two lenses 18 lie in parallel relationship to one another. Along each optical axis is located a photo-sensitive member 24, such as a film or plate, and these members are exposed to light passing through their respective lens assemblies 18-22 upon the activation of a disc-shaped shutter 26 which, as shown in FIG. 2, is interposed between the photo-sensitive element and their respective lens assemblies. This shutter 26 closes an opening 27 formed in a light mask 27a interposed between the lenses 18 and the photo-sensitive members 24, the periphery of the shutter riding in a U-shaped groove 27b in the mask 27a.

Exposure of each sensitized member 24 occurs when the shutter 26 is actuated. As best illustrated in FIG. 6 of the drawings, this shutter is mounted on a shaft 28. The rotational axis of this shaft lies intermediate and parallel to the respective optical axes 23 of the lens 18. Shutter 26 is provided with a radially-elongated aperture 30 which normally lies outside the path of light passing through each of the lens units 18, but, upon rotation of shaft 28, the aperture is intended to pass in front of each of the sensitized films or plates 24 and thereby expose the latter in sequential fashion to light collected by the respective lens assemblies. The time period between exposures of the respective elements 24 is therefore dependent upon the speed of rotation of the shaft 28 upon which the shutter 26 is carried. This rotational speed of shaft 28 is in turn governed by the linear motion of a cup-shaped piston 31 which will be described in connection with FIG. 3 in the drawings. It should be noted at this point, however, that the shaft 28 of FIG. 2 carries on one extremity thereof a radially-projecting pin (or roller bearing, see FIGS. 3 and 9) 32 designed to be receivable in a spirally-configured groove 34 formed in piston 31. The details of this construction are illustrated in FIGS. 3 and 5.

This pin 32 is shown in FIG. 3 in position to ride within the groove 34. Both the piston 31 and the shaft 28 are enclosed in a cylindrical housing 38 (see also FIG. 2) through which extends the extremity of shaft 28 on which the shutter 26 is mounted. As best brought out in FIG. 3, the cylindrical housing 38 encloses the piston 31 intermediate the two ends thereof, with the shaft 28 occupying one end portion of the enclosure and with the other end portion being filled with some material 40 capable of developing an explosive force when ignited. It is intended that this material 40 be activated by an electrical signal generated in the proximity device 16 of FIG. 1 when the missile 12 is at its point of closest approach to the target aircraft 10. Consequently, the assembly of FIG. 3 includes a suitable ignitor 42 (such as a squib) which receives the electrical signal from unit 16 over conductor 43 and produces the detonation of the material 40. However, this method of igniting a charge is well known in the field to which this invention relates, and it is recognized that other means for exploding the material 40 may readily be substituted for the particular apparatus shown.

The explosive 40 is contained within a chamber formed by one surface of the piston 31 and the inner surface of a plug 44 which closes that end of the cylindrical housing 38 opposite to that at which the shutter 26 is located. Inasmuch as it is necessary to provide means for venting the air within piston 31 following ignition of the charge material 30, a port 46 is provided in the housing 38. The port 46 leads to an annular recess 48, into which air from within the piston 31 passes through the longitudinal conduit 49 and the radial opening 50 formed in shaft 28 so as to prevent compression of this air when the piston moves. Otherwise, a build up of pressure within the cup-shaped piston 31 would oppose the force developed by the explosive charge 40 and could retard or slow down movement of the piston during operation.

When the charge material 40 is ignited in the manner above described, a force is produced against one end of the piston 31. This force causes the piston 31 to move within the housing 38, and, in FIG. 3 of the drawings, this movement will be to the right. The piston 31 is prevented from undergoing any rotational movement, however, by the action of a pair of V-shaped guides 51 which are cut out of oppositely-disposed surface areas on the piston, as best shown in FIG. 5. These V-shaped guides, or longitudinal slots, are designed to receive corresponding V-shaped projecting "rails" 52 which extend inwardly from the surface of the cylindrical housing 38 (see also FIG. 4). The piston 31 rides on these axial or longitudinal rails 52 which thus act to prevent the piston from moving in other than a linear direction.

In order to convert this linear motion of the piston 31 into a rotational movement of the shutter 26 so that the films or plates 24 of FIG. 2 may be sequentially exposed, the piston 31, which is of cup-shaped confiugration as brought out in FIG. 5 of the drawing, has its inner surface cut to form the groove 34 which possesses the spiral shape best shown in FIG. 3. This groove 34 is designed to receive therein the pin or bearing 32 which extends radially outwardly from one extremity of the shaft 28 (FIG. 6). The shaft 28 has an outer diameter which essentially coincides with the inner diameter of the cup-shaped piston 31, so that these two members have in effect a telescoping relationship. Expressed differently, as the piston 31 moves to the right upon activation of the charge material 40, it encloses therewithin an end portion of the shaft 28.

In so doing however, the pin 32 must follow the groove 34. Normally, the pressure of the pin 32 on the walls of this groove would tend to rotate the piston 31 about the longitudinal axis of the assembly. However, due to the presence of the rails 52 which extend longitudinally along the inner surface of the housing 38 and fit into the V-shaped slots 51 in the piston 31, such a rotational displacement of the piston does not occur. Consequently, the telescoping action of the two members 28 and 31 will necessarily result in a rotary movement of the shaft 28, since the spiral shape of the groove 34 will cause the pin 32 to inscribe a spiral path and the effect on the shaft 28 is such as to result in its movement through an angle the magnitude of which is dependent upon the design of the groove 34, which, in the present instance, is preferably such as to create a shaft rotation of slightly more than 180°.

FIG. 5 of the drawing more clearly illustrates the interior of the piston 31. It will be understood that the path to be followed by the pin 32 as the two members 28 and 31 assume a telescoping relationship will determine the speed at which the shutter 26 moves, and, consequently, the speed at which the aperture 30 therein exposes the sensitized films or plates 24. The longitudinal rails 52 which extend inwardly from the housing 38 may be replaced, if desired, by any other suitable guide means, since the only requirement is that the piston 31 possess a linear motion without the presence of any arcuate component.

It is possible to employ two apertures in the shutter 26 rather than the single one illustrated in FIG. 2 of the drawings. In such an event, these apertures should be so related to the location of the films or plates 24 that the latter will not be exposed simultaneously but instead in the required time sequence.

Although it is preferred that the piston 31 have its movement produced by the charge material 40 when the latter is ignited in the manner described, nevertheless it is within the scope of the present concept to utilize other means for developing a force on the inner surface of the piston 31. For example, the signal developed by the proximity fuse 16 of FIG. 1 may be applied to control the flow of a hydraulic fluid which is fed to the chamber between the piston and the plug 44. A still further alternative is to conduct some gaseous substance to this chamber through one or more conduits. It is only essential that the movement of the piston 31 occur with as little delay as possible following receipt by the force-producing apparatus of a signal from the proximity device 16.

From the above description it will be recognized that the invention herein set forth is of extreme simplicity both in design and operation. While retaining many of the advantages of previously-employed optical miss-distance indicators, it permits a considerable reduction in both size and weight of the equipment heretofore considered necessary to yield the required data. No electrical equipment is necessary except for the conductors which convey the initiating signal from the proximity device to the respective camera units. Therefore, reliability of the overall system is enhanced, since the possibility of any malfunction occurring in complex electronic circuitry need not be taken into account.

Obviously many modifications and variations of the present invention are possible in the light of the above teachings. It is therefore to be understood that within the scope of the appended claims the invention may be practiced otherwise than as specifically described.

I claim:

1. An optical unit designed to be carried by a target aircraft for the purpose of obtaining information as to the performance characteristics of a missile launched toward said aircraft with the object of impacting the latter, said optical unit comprising:

a pair of cameras each having a lens system and a photosensitive member associated therewith, each lens system being oriented to encompass a different field of view;

a single shutter arrayed upon actuation to expose in sequential fashion the respective photosensitive members of said cameras, said shutter being in the form of a disc-shaped element mounted for rotation about an axis lying intermediate the said pair of photosensitive members, said disc-shaped element having a single opening therein arranged, upon rotation of said element, to permit passage of light therethrough sequentially to said photosensitive members from their respective lens systems, said shutter being mounted for rotary movement on a shaft the axis of which extends generally parallel to the respective optical axes of the said lens systems;

a cylindrical housing, said shaft lying partially within said housing and extending outwardly from one end thereof, a slidable piston also enclosed within said cylindrical housing, said piston being of cup-shaped configuration and designed to receive therewithin an end portion of said shaft, said piston normally lying essentially end-to-end with respect to said shaft and movable longitudinally within said housing;

means for creating a longitudinal movement of said piston with respect to said housing; and means responsive to such longitudinal movement of said piston to produce a rotation of said shaft as one end portion of the latter enters the cup-shaped recess in said piston, to thereby effect an angular displacement of said shutter in consequence of which the photosensitive members of said cameras are sequentially exposed.

2. An optical unit according to claim 1, in which the means for creating a longitudinal movement of said piston with respect to said housing includes an explosive charge located within said cylindrical housing and located on the opposite side of said piston from said shaft; and means for energizing said explosive charge at a time when the said missile is in close proximity to said target aircraft.

3. The combination of claim 2, in which said means for energizing said explosive charge includes an ignitor located within said housing and activated when said missile reaches a point of close proximity to said target aircraft.

4. An optical unit designed to be carried by a target aircraft for the purpose of obtaining information as to the performance characteristics of a missile launched toward said aircraft with the object of impacting the latter, said optical unit comprising:

a pair of cameras each having a lens system and a photosensitive member associated therewith, each lens system being oriented to encompass a different field of view, a single rotatable shutter arranged to expose in sequential fashion the respective photosensitive members of said cameras when the shutter has undergone a predetermined angular displacement;

said shutter being in the form of a disc-shaped element of opaque material having a radially-elongated aperture formed therein;

a rotatable shaft upon which disc-shaped element is mounted;

a slidable member designed to move in linear fashion along a path coinciding with the axis of rotation of said shaft;

means for producing a linear movement of said slidable member; and means for translating the linear motion of said slidable member into a rotary movement of said shaft.

5. The combination of claim 4, in which said means for translating the linear movement of said slidable member into a rotary movement of said shaft includes:

a housing of cylindrical configuration within which said slidable member is disposed;

said shaft entering one end of said housing so as to normally lie approximately in end-to-end relationship with said slidable member, the latter being of cylindrical configuration and having a re-entrant portion into which one end portion of said shaft is receivable in telescoping fashion upon an axial movement of said slidable member, the re-entrant portion of said slidable member possessing a groove of spiral design cut into the surface of the re-entrant portion thereof which frictionally engages said shaft when such members assume the said telescoping relationship; and a pin projecting radially outwardly from said shaft and near that end portion thereof which is receivable in the re-entrant portion of said slidable member, said pin being receivable in said spiral groove;

so that, when said slidable member moves axially within said housing to bring such member into telescoping relationship with said shaft, said pin will ride in said groove and convert the linear movement of said slidable member into a rotary movement of said shaft and thereby cause said disc-shaped shutter to sequentially expose the said photosensitive members.

6. The combination of claim 5, in which the means for producing a linear movement of said slidable member comprises an explosive substance within said cylindrical housing and containing in the region between said slidable member and that end of said housing opposite to that through which said shaft enters; and means also contained in the said region of said cylindrical housing for detonating said explosive substance.

7. The combination of claim 6, in which said slidable member is formed within a pair of oppositely-disposed slots on the outer surface thereof extending linearly and parallel to the axis of rotation of said shaft; and in which said cylindrical housing is formed with a pair of guides extending inwardly from the inner surface thereof and receivable in the respective slots formed in said slidable member, said guides and slots acting together to preclude any rotary movement of said slidable member as the latter is caused to travel within said housing upon the detonation of said explosive substance.

References Cited by the Examiner

UNITED STATES PATENTS

| | | | |
|---|---|---|---|
| 2,742,834 | 4/1956 | Kondolf | 95—11 |
| 2,804,001 | 8/1957 | De Monthemy | 95—18 |
| 3,016,812 | 1/1962 | Chatlain | 95—11 |
| 3,058,109 | 10/1962 | Berning | 346—107 X |
| 3,202,069 | 8/1965 | Cummins | 95—36 |

FOREIGN PATENTS 1,336,612   7/1963   France.

JOHN M. HORAN, *Primary Examiner.*